United States Patent [19]
Maeda

[11] Patent Number: 5,403,538
[45] Date of Patent: Apr. 4, 1995

[54] CONTAINER WITH A SUSPENSION GRIP AND METHOD OF MANUFACTURING THE SAME

[75] Inventor: Seiki Maeda, Ichihara, Japan

[73] Assignee: Mitsui Petrochemical Industries, Ltd., Tokyo, Japan

[21] Appl. No.: 88,571

[22] Filed: Jul. 9, 1993

Related U.S. Application Data

[60] Division of Ser. No. 895,164, Jun. 5, 1992, abandoned, which is a continuation of Ser. No. 614,115, Nov. 16, 1990, abandoned.

Foreign Application Priority Data

Nov. 16, 1989 [JP] Japan .................. 1-298274
Nov. 16, 1989 [JP] Japan .................. 1-298275

[51] Int. Cl.⁶ .................. B29C 49/12; B29C 49/16
[52] U.S. Cl. .................. 264/530; 264/531; 264/532; 425/525; 425/529
[58] Field of Search .......... 264/530, 531, 532, 534, 264/523; 425/525, 529

[56] References Cited

U.S. PATENT DOCUMENTS

| | | | |
|---|---|---|---|
| D. 289,975 | 5/1987 | Wendt .................. | D9/413 X |
| 2,890,483 | 6/1959 | Soubier .................. | 264/532 |
| 3,208,710 | 9/1965 | Barton et al. .................. | 604/403 X |
| 3,387,732 | 6/1968 | Jellies .................. | 220/751 X |
| 3,570,718 | 3/1971 | Otsuka .................. | 215/100 A X |
| 3,581,928 | 6/1971 | St. Amand .................. | 220/751 X |
| 3,603,366 | 9/1971 | Albizati et al. .................. | 215/1 C X |
| 3,865,531 | 2/1975 | Moore et al. .................. | 425/525 |
| 3,921,630 | 11/1975 | McPhee .................. | 215/1 C X |
| 3,926,341 | 12/1975 | Lhoest .................. | 215/100 A X |
| 4,155,974 | 5/1979 | Valyi .................. | 264/530 |
| 4,207,990 | 6/1980 | Weiler et al. .................. | 215/1 C X |
| 4,261,473 | 4/1981 | Yamada et al. .................. | 264/532 |
| 4,395,378 | 7/1983 | Alberghini et al. .................. | 215/1 C X |
| 4,547,333 | 10/1985 | Takada .................. | 264/532 |
| 4,615,667 | 10/1986 | Roy .................. | 425/525 |
| 4,803,036 | 2/1989 | Maruhashi et al. .................. | 264/523 |
| 4,911,708 | 3/1990 | Maezaki et al. .................. | 215/DIG. 3 X |
| 4,925,055 | 5/1990 | Robbins, III et al. .................. | 215/1 C X |

FOREIGN PATENT DOCUMENTS

| | | | |
|---|---|---|---|
| 260773 | 6/1967 | Austria .................. | 215/1 C |
| 70641 | 1/1983 | European Pat. Off. .................. | 604/403 |
| 2131465 | 1/1972 | Germany .................. | 215/1 C |
| 2346194 | 3/1974 | Germany .................. | 215/100 A |
| 0187012 | 8/1987 | Japan .................. | 425/529 |
| 0011324 | 1/1988 | Japan .................. | 264/532 |
| 63-57051 | 3/1988 | Japan .................. | 220/751 |
| 63-248633 | 10/1988 | Japan .................. | 215/1 C |
| 1061608 | 3/1967 | United Kingdom .................. | 215/1 C |
| 2134495 | 8/1984 | United Kingdom .................. | 215/1 C |

*Primary Examiner*—Catherine Timm

[57] ABSTRACT

A container with a suspension grip can be used as an infusion solution container for drip transfusion of blood or drip infusion of a solution. A method of manufacturing the container comprises making the bottom of the preform relatively thick and providing a blow metal mold on the bottom of its cavity having the shape of a container to be produced from the preform with a resin receptacle for forming a container grip so that at least part of the thick bottom of the preform enters the resin receptacle for grip formation at the time of blow molding to form a container grip.

5 Claims, 7 Drawing Sheets

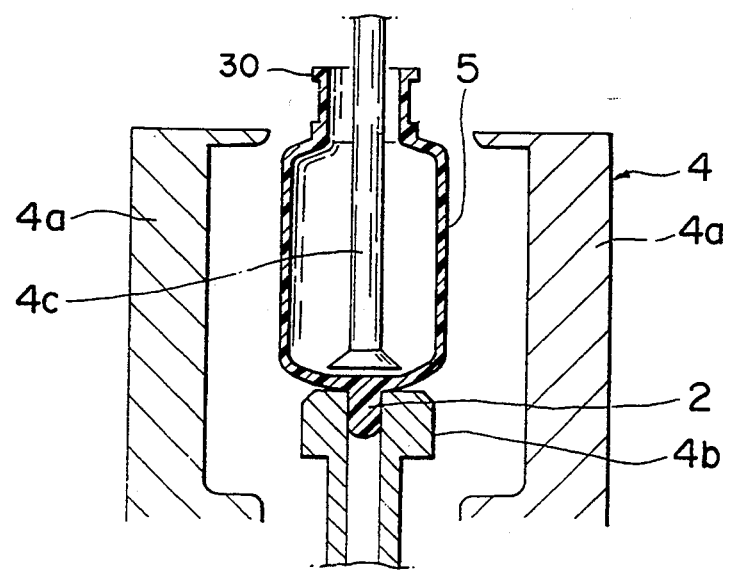
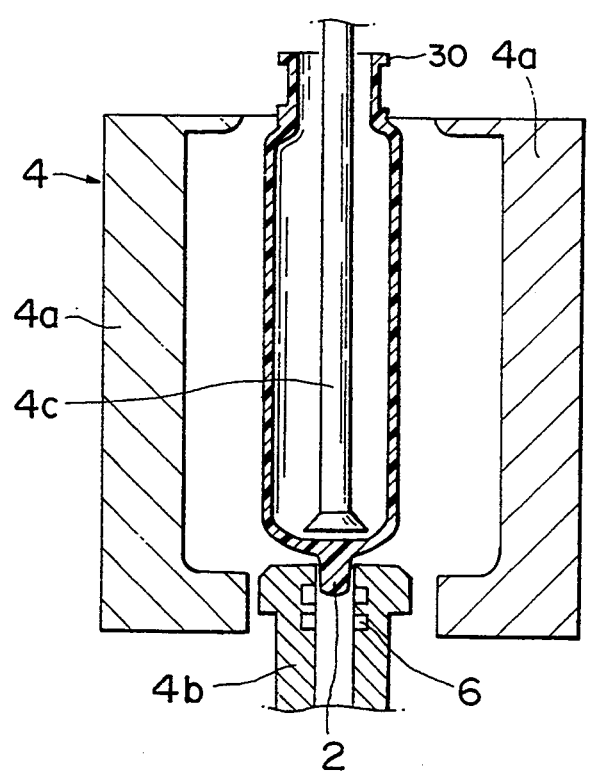
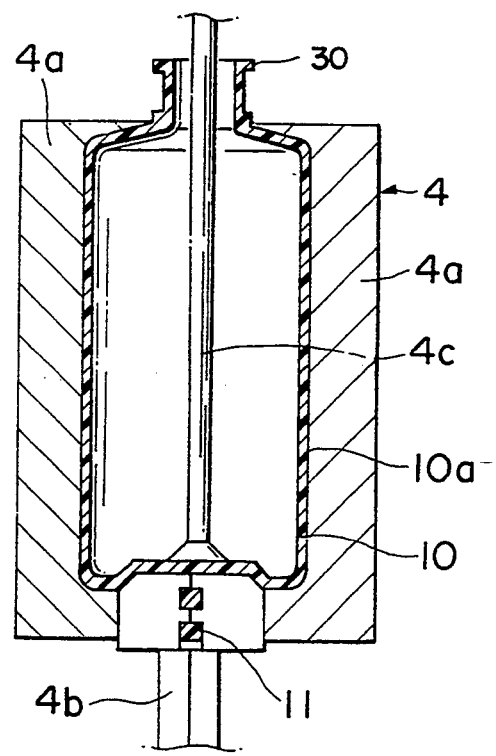

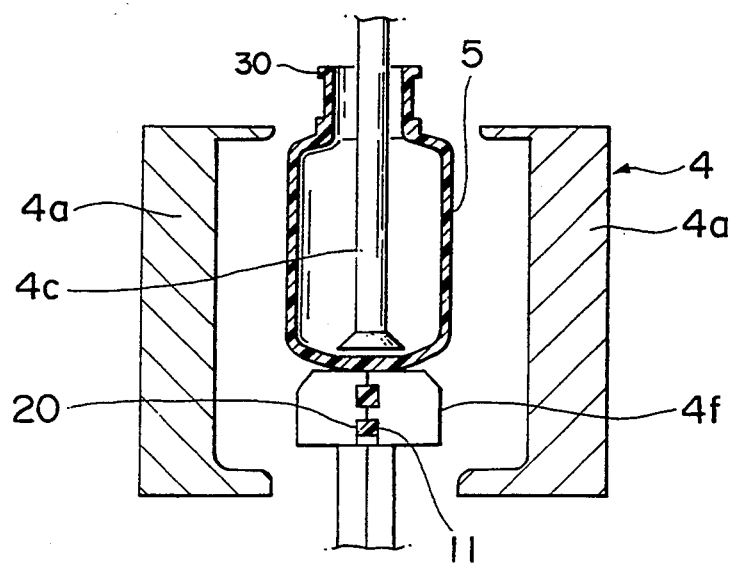
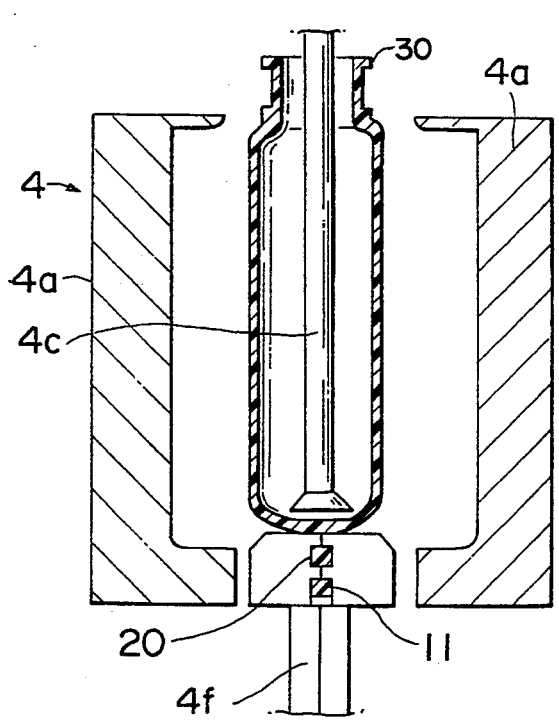
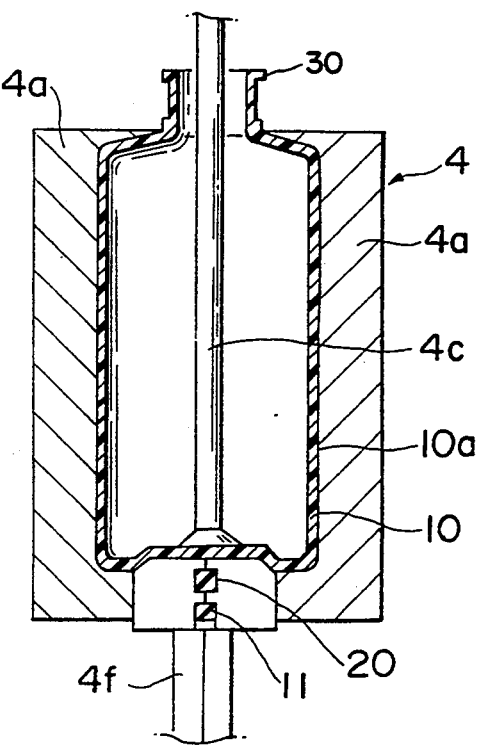

CONTAINER WITH A SUSPENSION GRIP AND METHOD OF MANUFACTURING THE SAME

This application is a divisional of application Ser. No. 07/895,164, filed on Jun. 5, 1992, which is a continuation of application Ser. No. 07/614,115, filed on Nov. 16, 1990, both now abandoned.

BACKGROUND OF THE INVENTION

This invention relates to a container with a suspension grip and a method of manufacturing the same and more particularly it relates to an infusion solution container to be used for drip transfusion of blood or drip infusion of a solution as well as to a method of manufacturing the same.

Conventionally, an infusion solution container to be used for drip transfusion of blood or drip infusion of a solution has to be held upside down so that the bottom of the container comes to the top and the solution outlet faces downward from the bottom for ease of giving blood or solution to the patient.

For manufacturing such a container, there has been known a hot blow molding method by means of which a heated and bottomed parison or preform is inflated by hot air blown into the preform.

The bottom of a preform is not sufficiently thick and normally carries a trace of a gate produced at the time of preparation of the preform.

Therefore, the bottom of the preform has to be pressed by means of a push rod while the entire preform is inflated, leaving no room for forming a grip on the bottom in terms of both time and space. Consequently, a grip has to be fitted later to the container if the container is required to have a grip by which it is suspended for use.

SUMMARY OF THE INVENTION

In view of the technological background as described above, the object of the present invention is therefore to provide a technique to obtain without difficulty a container with a suspension grip arranged at the bottom thereof.

A container according to the invention is made of a synthetic resin material and comprises main body with a generally straight, non-threaded opening having a flange therearound, the main body having a flat bottom and the container having a suspension grip with is integrally formed with the bottom of the container, the suspension grip allowing the container to easily be suspended.

A method of manufacturing such a container according to the invention is a blow molding method for molding a container by blowing hot gas into a bottomed cylindrical preform to inflate it in a blow metal mold, wherein the bottom of said preform is made relatively thick and said blow metal mold is provided on the bottom of its cavity having the shape of a container to be produced from said preform with a resin receptacle for forming a container grip so that at least part of said thick bottom of the preform enters the resin receptacle for grip formation at the time of blow molding to form a container grip.

The blow molding process according to the above described method may not necessarily be a one-step process but a two-step method comprising a pre-blow molding step and a main blow molding step. When a two-step blow-molding method is employed, a preform is placed in a pre-blow metal mold for pre-blow molding by setting the thick bottom section of a preform into engagement with an engaging recess disposed at the bottom of the pre-blow metal mold while a preform with a thick bottom is being prepared and then a molded intermediary body is obtained by pre-blowing the preform (after preliminary contraction of the preform).

Then the molded intermediary body is placed in a main blow metal mold provided on the bottom of its cavity with a receptacle for forming a container grip so that at least part of said thick bottom of the preform enters the resin receptacle for grip formation.

A hole may be made through the grip for ease of suspending the container by arranging a pin within the resin receptacle for grip formation without departing from the scope of the present invention.

As described below, a blow metal mold to be used for the purpose of the present invention may comprise a second bottom forming metal mold section along with a barrel forming metal mold section for preparing a hollow cylindrical body and a first bottom forming metal mold section. With such an arrangement, a stretcher rod is disposed in juxtaposition with said first bottom forming metal mold section.

Said first bottom forming metal mold section is provided with a grip forming resin receptacle disposed at its front end and so arranged that it may be axially movable within the cavity of the mold. Said stretcher rod is also axially movable within the cavity of the barrel forming metal mold section.

In a process for manufacturing a synthetic resin container by using such a blow metal mold, a bottomed preform or an intermediary molded body obtained by blow molding said preform that has been prepared in advance is placed in position within a blow metal mold as described above. Then, the bottom of said bottomed preform or molded intermediary body is placed in position with said blow metal mold and, thereafter axially stretched by pinching the bottom with said stretcher rod and said first bottom forming metal mold section from inside and outside and moving them at an identical rate. As the preform or intermediary body is elongated, it is blow-molded under a condition where the first bottom forming metal mold section and the barrel forming metal mold section are properly assembled to obtain a container with a suspension grip.

Alternatively, the blow metal mold may comprise a barrel forming metal mold section, a second bottom forming metal mold section, a stretcher rod and a stretching counter metal mold section as described below.

The second bottom forming metal mold section in this alternative arrangement is divided into two halves, which are so arranged at an end of said barrel forming metal mold section that they are slidable to close and open themselves, a resin receptacle being arranged on each of them on the surface that faces its counterpart. A bottomed and cylindrical preform or its bottom is so formed that the molded intermediary body of the preform can be pinched by said resin receptacles for grip formation at the bottom when it is being blow-molded. Said stretcher rod is axially movable within the cavity of the bottom forming metal mold section and said stretching counter metal mold section is arranged in juxtaposition with said stretcher rod and also axially movable within the cavity of the bottom forming metal mold section in such a manner that said stretching counter metal mold section and said second bottom forming metal mold section take, when combined, the role of a first bottom forming metal mold section as described earlier.

In a process for manufacturing a synthetic resin container according to the invention by using such an arrangement of blow metal mold, a bottomed preform or an intermediary molded body obtained by blow molding said preform that has been prepared in advance is placed in position within a blow metal mold as described above. Then, the bottom of said bottomed preform or molded intermediary body is placed in position with said blow metal mold and, thereafter, axially stretched by pinching the bottom with said stretcher rod and said second bottom forming metal mold section from inside and outside and moving them at an identical rate. After the stretching counter metal mold section is moved away from the blow metal mold, said second bottom forming metal mold section is closed and combined with the barrel forming metal mold section for blow molding.

Still alternatively, the main blow metal mold of a metal mold assembly to be used for the purpose of the present invention comprises a barrel forming metal mold section and a grip protecting metal mold section as well as a stretcher rod arranged in juxtaposition with the grip protecting metal mold section. When combined in position, said barrel forming metal mold section and said grip protecting metal mold section define the cavity that corresponds to the profile of the container to be produced. Said grip protecting metal mold section is provided with a grip protecting space at its front end and axially movable within the cavity. The stretcher rod is also axially movable with said cavity of the barrel forming metal mold section.

In a process for manufacturing a synthetic resin container according to the invention by using such an arrangement of blow metal mold, an intermediary molded body obtained by blow molding a preform has a grip formed on its bottom at the time of pre-blow molding. During the step of main blow molding using the main blow metal mold, the intermediary molded body is placed in position within said main blow metal mold and the stretcher rod is introduced into said intermediary molded body. Thereafter, the grip of the intermediary molded body is introduced into the grip protecting space of the grip protecting metal mold section and the bottom of the intermediary molded body is pinched by said stretcher rod and said grip protecting metal mold section from inside and outside respectively. Then, said stretcher rod and said grip protecting metal mold section are axially moved at an identical rate to axially elongate the intermediary molded body which is then blow-molded into a final product under a condition where said grip protecting metal mold section and said barrel forming metal mold section are properly combined.

When such a process of manufacturing a container using a main blow metal mold is employed, the step of main blow-molding can be conducted without problem because it does not affect the grip that has been prepared in the course of pre-blow molding and is completely protected by the grip protecting metal mold section.

Still alternatively, the main blow metal mold may comprise a stretching counter metal mold section along with a barrel forming metal mold section, a grip protecting metal mold section and a stretcher rod. With such an arrangement, said grip protecting metal mold section is divided into two halves, which are slidably arranged at an end of said barrel forming metal mold section to close and open themselves. A grip protecting space is arranged on each of them on the surface that faces its counterpart in such a manner that the grip of an intermediary molded body which is placed in position within the mold is held in said grip protecting spaces. Said stretcher rod is axially movable within the cavity of the barrel forming metal mold section and said stretching counter metal mold section is juxtaposed with said stretcher rod in such a manner that it is axially movable within the cavity of said barrel forming metal mold section.

In a process for manufacturing a synthetic resin container according to the invention by using such an arrangement of blow metal mold, an intermediary molded body is placed in position within the main blow metal mold and the bottom of the intermediary molded body is pinched by said stretcher rod and said grip protecting metal mold section from inside and outside respectively, which are moved at an identical rate to axially elongate the intermediary molded body. Then, after the stretching counter metal mold section is moved away from the main blow metal mold, said grip protecting metal mold section is closed and combined with said barrel forming metal mold section and the grip of the intermediary molded body is introduced into said grip protecting spaces, when the intermediary molded body is blow molded to a final product.

With a method of manufacturing a container with a grip according to the invention as described above the grip is integrally formed with the container main body.

When a process comprising two steps of pre-blow molding and main blow molding is employed, the grip of a container is formed in the pre-blow molding step and heat set during the following main-blow molding step. Moreover, since the grip is formed at the time of preparation of an intermediary molded body the bottom of the container to be produced can be formed to a proper shape having a pleasant appearance.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

Now the present invention will be described in greater detail by referring to the accompanying drawings that illustrate preferred blow metal mold configurations to be used for the purpose of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5 through 7 are sectional side views of a main blow metal mold showing three different stages of a method of manufacturing a container with a suspension grip according to the invention, said main blow mold having a first preferred configuration.

FIGS. 15 through 17 are sectional side views of a main blow metal mold similar to FIGS. 5 through 7 but having a third preferred configuration.

DETAILED DESCRIPTION OF THE INVENTION

<First Preferred Mold Configuration>

Figure 1:
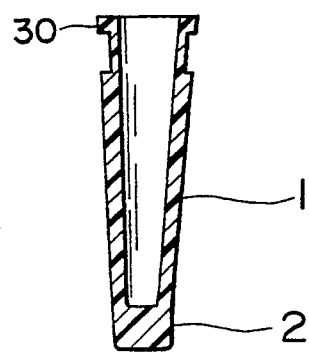
FIG. 1 is a front view of a preform of a container according to the invention.
Figure 2:
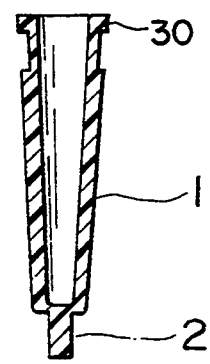
FIG. 2 is a side view of the preform of FIG. 1.

A bottomed preform 1 is prepared by using a injection molding machine. The preform 1 has a straight opening with a non-threaded flange 30 and is made of a polypropylene homopolymer with MFRO. 5 g/min and molded at an injection temperature of 220° C. and a metal mold temperature of 20°. It has a neck height of 15 mm, a barrel height of 120 mm and a barrel thickness of 3 mm and comprises a thickened portion 2 at the bottom as illustrated in FIGS. 1 and 2. The width of said thickened portion 2 is equal to that of the bottom of the preform 1 shown in FIG. 1 or 25 mm, whereas the thickness of said thickened portion 2 is a half of its width or 12.5 mm and the length of said thickened portion 2 is 10 mm.

Now a container is made from said preform through a two-step blow molding process as described below.

Figure 3:
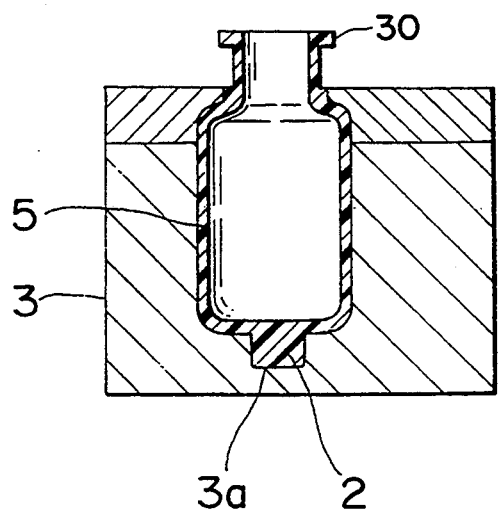
FIG. 3 is a sectional front view of a pre-blow metal mold to be used for the purpose of the invention.
Figure 4:
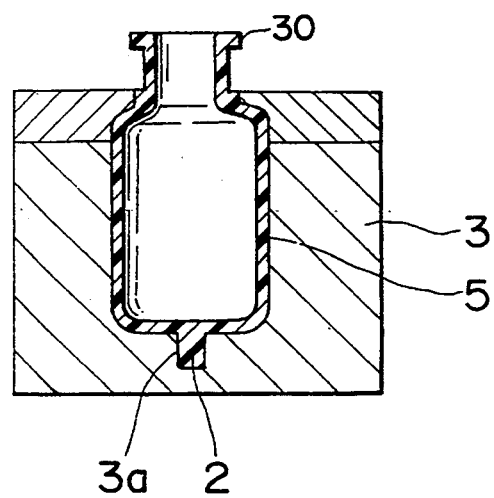
FIG. 4 is a sectional side view of the pre-blow metal mold of FIG. 3.

Metal molds used include a pre-blow metal mold 3 having a configuration as illustrated in FIGS. 3 and 4 and a main blow mold 4 as illustrated in FIGS. 5 through 7.

The pre-blow metal mold 3 is provided with an engaging recess 3a at the bottom of its cavity for engagedly receiving the thickened portion 2 of the preform 1 and divided into a male half and a female half along the shoulder section of the intermediary molded body 5 to be formed from the preform 1.

The preform 1 is placed in position within the cavity of the pre-blow metal mold 3 as the latter is opened and the thickened portion 2 is received by engaging recess 3a for mutual engagement and then it is blow-molded to produce an intermediary molded body 5. The pre-blow molding is conducted for regulation of temperature and consequently a container having a relatively high heat resistance can be obtained. The pre-blow molding is preferably conducted under the following conditions.

| | |
|---|---|
| pre-blow metal mold temperature: | 140° C. |
| pre-blow elongation ratios: | vertically 1.0 time |
| | horizontally 1.2 times |
| pre-blow air pressure: | 5 kg/cm² |

As illustrated in FIGS. 5 through 7, the main blow metal mold 4 comprises a pair of barrel forming metal mold sections 4a, 4a and a bottom forming metal mold section 4b as well as a stretcher rod 4c, of which the pair of barrel forming metal mold sections 4a, 4a and the bottom forming metal mold section 4b are combined in position to define the cavity of the mold having a configuration that corresponds to the profile of the container to be formed.

Said bottom forming metal mold section 4b is constituted by two rod-shaped members, the thickened portion 2 being pinched by the tips of the two members. A resin receptacle for grip formation 6 is formed on the inner surface of each of the rod-shaped members. Said resin receptacle for grip formation 6 has a configuration which is good for forming a suspension hole 12 running through the grip 11 of the container to be molded. The bottom forming metal mold section 4b is axially movable within the cavity of the main blow metal mold 4.

Said stretcher rod 4c is also axially movable within the cavity of the main blow metal mold 4.

At the onset of the step of main blow molding, the intermediary molded body 5 obtained from the pre-blow molding step as described earlier is placed in position in the main blow metal mold 4. At this time, the thickened portion 2 of the intermediary molded body 5 is introduced into the bottom forming metal mold section 4b while the stretcher rod 4c is led into the intermediary molded body 5 so that the bottom of the intermediary molded body 5 is pinched by the stretcher rod 4c and the bottom forming metal mold section 4b from inside and outside respectively (FIG. 5).

Then, the stretcher rod 4c is moved further down to push the inner surface of the bottom of the intermediary molded body 5 while the bottom forming metal mold section 4b is retracted downward to pull and consequently axially elongate the intermediary molded body 5 (FIG. 6). It should be noted that both the stretcher rod 4c and the bottom forming metal mold section 4b go down at an identical rate for elongation of the intermediary molded body 5.

Figure 10:
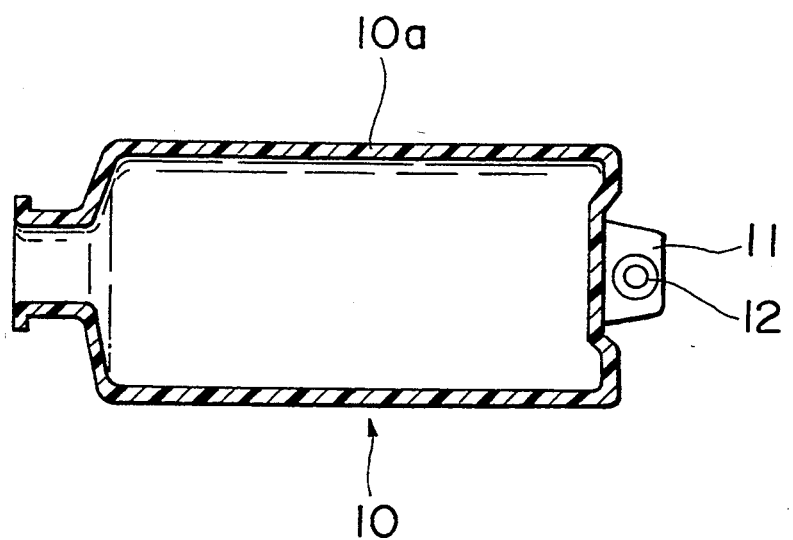
FIG. 10 is a sectional view of a container according to the invention.
Figure 11:
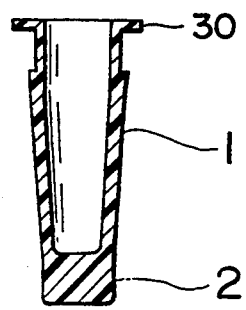
FIG. 11 is a front view of a preform of a container according to the invention.
Figure 12:
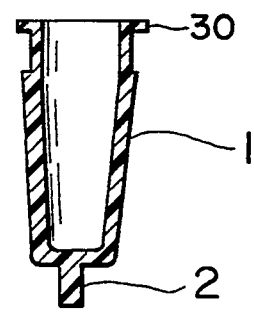
FIG. 12 is a side view of the preform of FIG. 11.

Thereafter, as illustrated in FIG. 7, the main blow metal mold 4 is closed and the intermediary molded body 5 is blown to form a final product. At this stage, the grip 11 of the container is also formed. More specifically, the main blow metal mold 4 is closed and hot air is blown into the mold to horizontally expand the intermediary molded body 5 to produce a container 10 comprising a container main body 10a having a barrel diameter of 90 mm, a volume of 1100 ml and a weight of 40 g and a grip 11 which is integral with the container main body 10a (FIG. 10).

In an experiment, a container according to the invention was produced under the following conditions.

| | |
|---|---|
| main blow metal mold temperature: | 25° C. |
| main blow elongation ratios: | vertically 1.6 times |
| | horizontally 3.3 times |
| main blow air pressure: | 10 kg/cm² |

The wall of the obtained container 10 had an even thickness and was beautifully transparent. Moreover, the container showed an excellent strength when it was dropped repeatedly. Since the grip 11 of the container 10 was provided with a suspension hole 12, it could be suspended with ease when used as a container for an infusion solution.

The container was a soft and flexible one that can be easily collapsed. Since a polyolefine resin material was used, it did not contain any plasticizer or ingredients that can easily elute and therefore was highly stable. It had a high heat resistivity and therefore could stand sterilization processes using hot steam.

A preform 1 to be used to produce a container through the process described here does not necessarily have a thickened portion 2 with a configuration as described above, and it may simply have a thickened bottom portion. While a container undergoes two blow steps for elongation in the above process, one of the steps can be omitted without affecting the result of the process.

<Second Preferred Mold Configuration>

Figure 8:
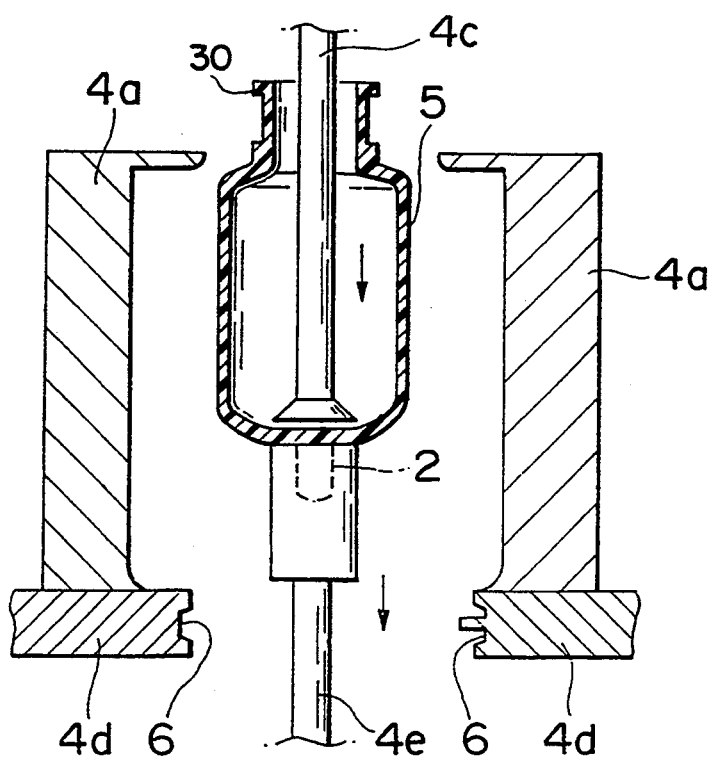
FIGS. 8 and 9 are sectional side views of a main blow metal mold similar to FIGS. 5 through 7 but having a second preferred configuration.
Figure 9:
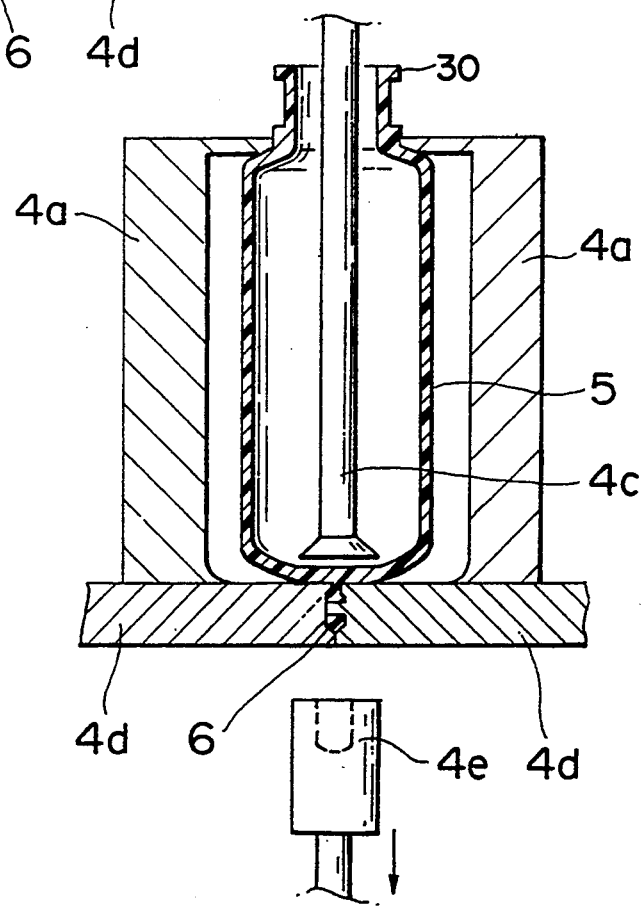

While the stretcher rod 4c and the bottom forming metal mold section 4b of the main blow metal mold 4 go down at an identical rate for stretching an intermediary molded body 5 and then the main blow metal mold 4 is closed for blow molding a final product and simultaneously forming a grip 11 in a process where the blow metal mold having the first preferred configuration as described above is used (the bottom forming metal mold section 4b being used for molding the bottom), the blow-metal mold may be alternatively so configured that an intermediary molded body 5 is axially stretched first and then blow molded and a grip 11 is formed by replacing the bottom of the mold with a bottom forming metal mold section 4d as illustrated in FIGS. 8 and 9.

In FIGS. 8 and 9, the main blow metal mold 4 has a configuration which is different from that of the first preferred mold configuration in that the first bottom forming metal mold section 4b is replaced by a second bottom forming metal mold section 4d and a stretching counter metal mold section 4e. Said second bottom forming metal mold section 4d is divided into two halves in such a manner that they are combined and slidable at an end of said barrel forming metal mold section 4a to close and open themselves. Each of the two halves of the second bottom forming metal mold section 4d is provided with a resin receptacle for grip formation 6 on the surface that faces its counterpart so that the bottom of an intermediary molded body 5 placed in position within the closed blow metal mold is pinched by the two halves of said bottom forming metal mold section 4d between the two resin receptacles for grip formation 6. Said stretching counter metal mold section 4e is juxtaposed with said stretcher rod 4c in such a manner that it is axially movable within the cavity of the barrel forming metal mold section 4a.

While the stretcher rod 4c and the bottom forming metal mold section 4b of a blow metal mold having the first preferred mold configuration are moved downward at an identical rate to stretch the intermediary molded body 5 in it, the stretcher rod 4d and the stretching counter metal mold section 4e of a blow metal mold having the second preferred mold configuration are moved downward at an identical rate to elongate the intermediary molded body 5 in a similar manner.

While the intermediary molded body 5 is pinched at its thickened portion 2 by the tips of the two halves of said first bottom forming metal mold section 4b of the blow metal mold having the first preferred mold configuration and a grip 11 is formed by said bottom forming metal mold section 4b, the intermediary molded body 5 is axially elongated by using the stretcher rod 4c of the blow metal mold having the second preferred mold configuration and thereafter the bottom of said intermediary molded body 5 is pinched by the two halves of the second bottom forming metal mold section 4d between the resin receptacles for grip formation 6 and a grip 11 is formed in the resin receptacles 6. At this stage, the stretching counter metal mold section 4e is moved away from the blow metal mold.

With such an arrangement, the bottom forming metal mold section of a blow metal mold can be made to have simple structural features and consequently the cost of manufacturing a container according to the invention can be reduced.

<Third Preferred Mold Configuration>

Figure 13:
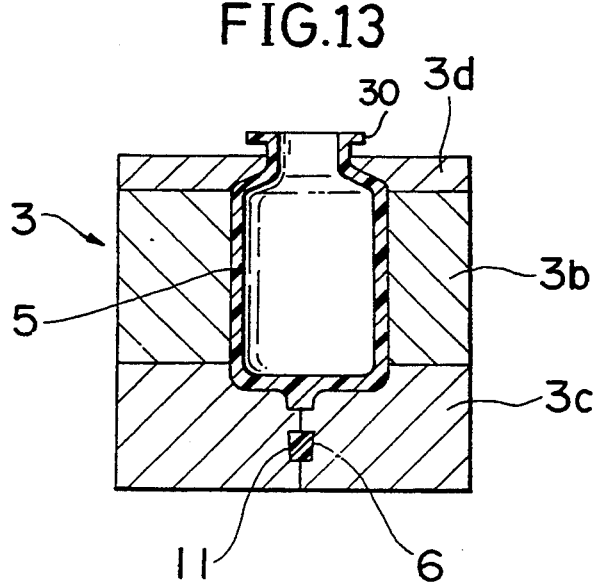
FIG. 13 is a sectional front view of a pre-blow metal mold to be used for the purpose of the present invention.
Figure 14:
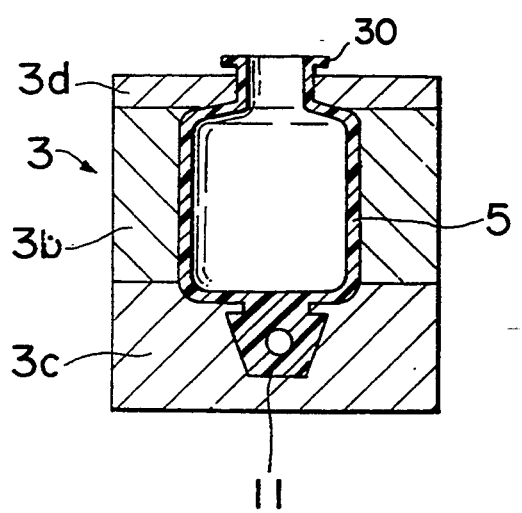
FIG. 14 is a sectional side view of the pre-blow metal mold of FIG. 13.

Now an alternative blow metal mold comprising a pre-blow metal mold 3 as illustrated in FIGS. 13 and 14 and a main blow metal mold 4 as illustrated in FIGS. 15 through 17 will be described.

The pre-blow metal mold 3 comprises a shoulder forming openable mold section 3d, a barrel forming openable mold section 3b and a bottom forming openable mold section 3c, which bottom forming openable mold section 3c is divided into two halves, each being provided with a resin receptacle for grip formation 6 on the surface that faces its counterpart. A flat grip 11 having a suspension hole at the middle is produced from the resin receptacles for grip formation 6.

The most remarkable feature of the process using this third preferred mold configuration is that the grip 11 of a container according to the invention is formed in the step of pre-blow molding that precedes the step of main blow molding.

More specifically, a preform 1 is placed in position in the cavity of the pre-blow metal mold 3 as the shoulder forming openable mold section 3d is opened. Then an intermediary molded body 5 is formed from the preform 1 by blow molding. The pre-blow molding is conducted for regulation of temperature and consequently a container having a relatively high heat resistance can be obtained. The pre-blow molding is preferably conducted under the following conditions.

| | |
|---|---|
| pre-blow metal mold temperature: | 140° C. |
| pre-blow elongation ratios: | vertically 1.0 times |
| | horizontally 1.2 times |
| pre-blow air pressure: | 5 kg/cm$^2$ |

As illustrated in FIGS. 15 through 17, the main blow metal mold 4 comprises a pair of barrel forming metal mold sections 4a. 4a and a grip protecting metal mold section 4f that also acts as a bottom forming metal mold section as well as a stretcher rod 4c juxtaposed with the grip protecting metal mold section 4f, of which the pair of barrel forming metal mold sections 4a, 4a and grip protecting metal mold section 4f are combined in position to define the cavity of the mold having a configuration that corresponds to the profile of the container to be formed.

Said grid protecting metal mold section 4f has the shape of a rod and is divided into two halves, each having a grip protecting space 20 for containing and protecting the molded suspension grip 11. Said grid protecting metal mold section 4f is axially movable with the cavity.

The stretcher rod 4c which is juxtaposed with the grip protecting metal mold section 4f is also axially movable within the cavity.

At the onset of the step of main blow molding, the intermediary molded body 5 obtained from the preblow molding step as described earlier is placed in position in the main blow metal mold 4. At this time, the suspension grip 11 is placed into the grid protecting spaces 20 while the stretcher rod 4c is led into the intermediary molded body 5 so that the bottom of the intermediary molded body 5 is pinched by the stretcher rod 4c and the grip protecting metal mold section 4f from inside and outside respectively (FIG. 15).

Then, the stretcher rod 4c is moved further down to push the inner surface of the bottom of the intermediary molded body 5 while the grip protecting metal mold section 4f is retracted downward to pull and consequently axially elongate the intermediary molded body 5 (FIG. 16). It should be noted that both the stretcher rod 4c and the grip protecting metal mold section 4f go down at an identical rate for elongation of the intermediary molded body 5.

Thereafter, the main blow metal mold 4 is closed and the intermediary molded body 5 is blown to form a final product or a container 10 comprising s container main body 10a having a barrel diameter of 90 mm, a volume of 1110 ml and a weight of 40 g and a grip 11 which is integrally formed at the bottom of the container main body 10a (FIGS. 17 and 10).

In an experiment, a container according to the invention was produced under the following conditions.

| main blow metal mold temperature: | 25° C. |
|---|---|
| main blow elongation ratios: | vertically 1.6 times horizontally 3.3 times |
| main blow air pressure: | 10 kg/cm$^2$ |

The wall of the obtained container 10 had an even thickness and was beautifully transparent. Moreover, the container showed an excellent strength when it was dropped repeatedly. Since the grip 11 of the container 10 was provided with a suspension hole 12, it could be suspended with ease when used as a container for an infusion solution.

The container was a soft and flexible one that can be easily collapsed. Since a polyolefine resin material was used, it did not contain any plasticizer or ingredients that can easily elute and therefore was highly stable. It had a high heat resistivity and therefore could stand sterilization processes using hot steam.

<Fourth Preferred Mold Configuration>

Figure 18:
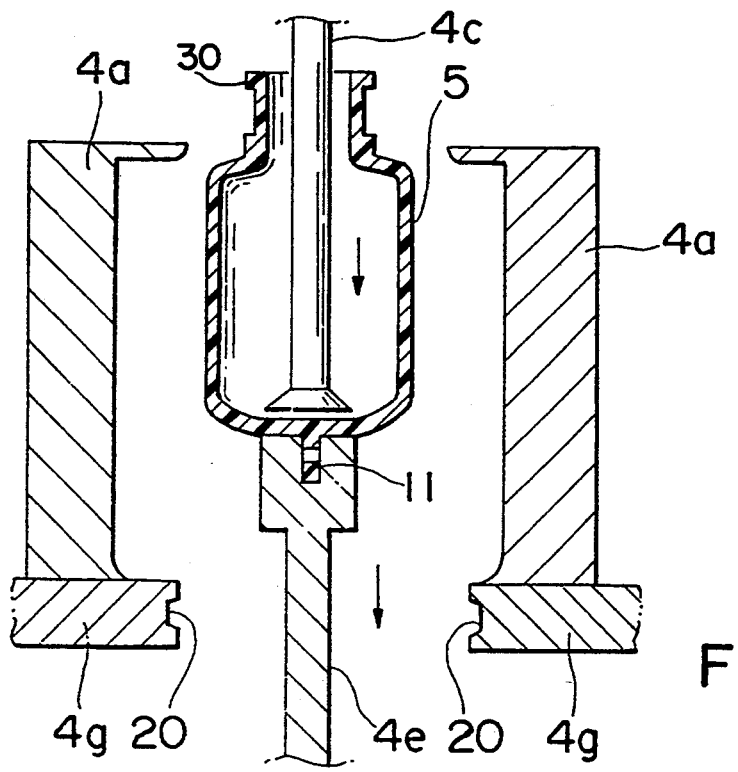
FIGS. 18 and 19 are sectional side views of a main blow metal mold similar to FIGS. 5 through 7 but having a fourth preferred configuration.
Figure 19:
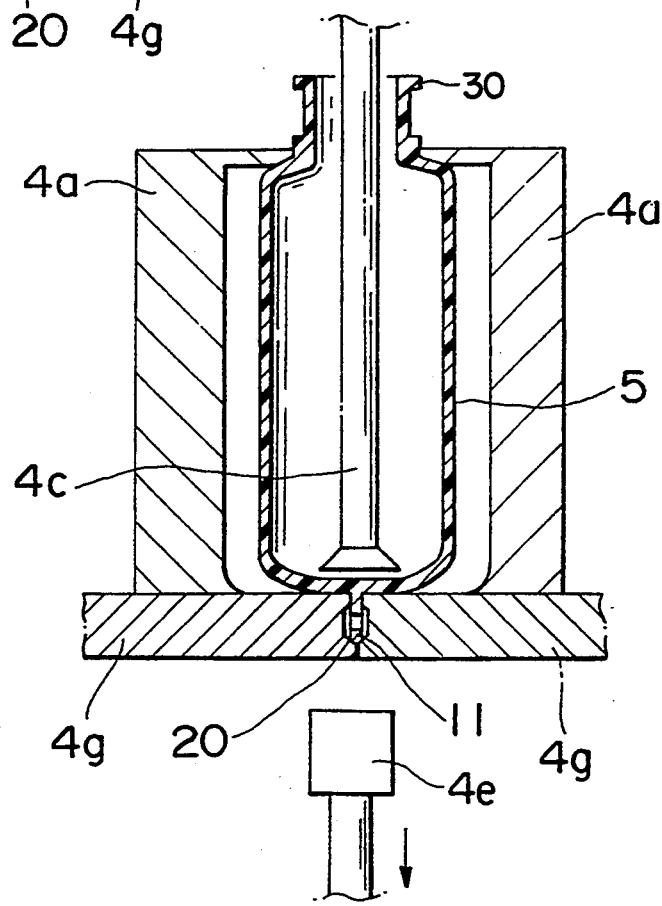

While the stretcher rod 4c and the grip protecting metal mold section 4f of the main blow metal mold 4 go down at an identical rate for stretching an intermediary molded body 5 and then the main blow metal mold 4 is closed for blow molding a final product and simultaneously forming a grip 11 in a process where the blow metal mold having the third preferred configuration as described above is used (the grip protecting metal mold section 4b being used for molding the bottom), the blow metal mold may be alternatively so configured that an intermediary molded body 5 is axially stretched in the first place while its grip 11 is being held by the stretching counter metal mold section 4e, which is thereafter replaced by a grip protecting metal mold section 4g for blow molding the intermediary molded body 5 into a final product in the main blow metal mold As illustrated in FIGS. 18 and 19, the first grip protecting metal mold section 4f of the blow metal mold having the third preferred configuration as described above is replaced by a second grip protecting metal mold section 4g and a stretching counter metal mold section 4e. Said second bottom forming metal mold section 4g is divided into two halves in such a manner that they are combined and slidable at an end of said barrel forming metal mold section 4a to close and open themselves. Each of the two halves of the second bottom forming metal mold section 4d is provided with a resin receptacle for grip formation 6 on the surface that faces its counterpart so that the bottom of an intermediary molded body 5 placed in position within the closed blow metal mold is pinched by the two halves of said bottom forming metal mold section 4d between the two resin receptacles for grip formation 6. Said stretching counter metal mold section 4e is juxtaposed with said stretcher rod 4c in such a manner that it is axially movable within the cavity of the barrel forming metal mold section 4a.

While the stretcher rod 4c and the bottom forming metal mold section 4b of a blow metal mold having the third preferred mold configuration are moved downward at an identical rate to stretch the intermediary molded body 5 in it, the stretcher rod 4d and the stretching counter metal mold section 4e of a blow metal mold having the fourth preferred mold configuration are moved downward at an identical rate to elongate the intermediary molded body 5 in a similar manner.

While the suspension grip 11 of the intermediary molded body 5 is placed into the grip protecting spaces 20 of said grip protecting metal mold section 4f of the blow metal mold having the third preferred configuration, the intermediary molded body 5 is axially elongated by means of the stretcher rod 4c and other components and thereafter the second grip protecting metal mold section 4g is closed to contain the grip 11 of said intermediary molded body 5 within the grip protecting spaces 20 for protection.

At this stage, the stretching counter metal mold section 4e is moved away from the blow metal mold.

With such an arrangement, the blow metal mold can be made to have very simple structural features.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a container with a suspension grip, the container being suspendable from the suspension grip, the method comprises the steps of:
   setting a bottomed preform or a bottomed intermediary molded body, which is prepared by blow molding said preform, in a blow metal mold, said blow metal mold comprising a) a barrel-forming metal mold section, b) a bottom-forming metal mold section, and c) a stretcher rod arranged axially opposite to said bottom-forming metal mold section, said barrel-forming metal mold section and said bottom-forming metal mold section, in combination, forming a cavity having a same shape as that of the container, said bottom-forming metal mold section being provided at the front end thereof with a resin receptacle for forming the suspension grip of the container, said bottom-forming metal mold section and said stretcher rod each being axially movable within said cavity; and blow molding said preform or said intermediary molded body within said blow metal mold under the condition of said bottom-forming metal mold section being combined with said barrel-forming metal mold section while axially stretching the preform or the intermediary molded body by lowering the stretcher rod and the bottom-forming metal mold section at a same speed under the condition of the bottom of the preform or of the intermediary molded body being pinched from the inside and outside thereof respectively by the stretcher rod and the bottom-forming metal mold section.

2. A method of manufacturing a container with a suspension grip, which comprises the steps of:

setting a bottomed preform or a bottomed intermediary molded body, which is prepared by blow molding said preform, in a blow metal mold, said blow metal mold comprising a) a barrel-forming metal mold section forming a cavity, b) a bottom-forming metal mold section, c) a stretcher rod, and d) a stretching counter metal mold section arranged axially opposite to said stretcher rod, said bottom-forming metal mold section being divided into two halves which are faced with each other and are arranged slidably onto the lower end of the barrel-forming metal mold section so as to be closeable and openable, each of said halves being provided on the facing surface thereof with a resin receptacle for forming the suspension grip of the container so that the bottom of said preform or of said intermediary molded body can be pinched between the resin receptacles of said halves when the two halves are closed, said stretcher rod and said stretching counter metal mold section each being axially movable within the cavity of said barrel-forming metal mold section;

axially stretching said preform or said intermediary molded body by lowering the stretcher rod and the stretching counter metal mold section as a same speed under the condition of the bottom of the preform or of the intermediary molded body being pinched from the inside and outside thereof respectively by the stretcher rod and the stretching counter metal mold section;

removing said stretching counter metal mold section from said blow metal mold;

closing said bottom-forming metal mold section to make a condition of said bottom-forming metal mold section being combined with said barrel-form metal mold section; and blow molding said preform or said intermediary molded body within said blow metal mold under the combined condition of the bottom-forming metal mold section and the barrel-forming metal mold section.

3. A method of manufacturing a container with a suspension grip, said container being made of a synthetic resin material and being comprised of a bottomed container main body and the suspension grip being integrally formed with the bottom of the container main body, the container being suspendable from the suspension grip, the method comprises the steps of:

setting a preform having a barrel portion and a bottom portion in a heated pre-blow metal mold forming a first cavity, the bottom portion of said preform being thick relative to the barrel portion, said first cavity being provided on the bottom thereof with a resin receptacle for forming the suspension grip of the container;

pre-blow molding the preform into an intermediary molded body having the suspension grip within said pre-blow metal mold by pre-blowing a hot gas in the preform to inflate the preform;

forming the suspension grip in said receptacle by closing a portion of the pre-blow metal mold about the bottom portion of the preform after the preform is set in the pre-blow metal mold;

setting the intermediary molded body in a main blow metal mold forming a second cavity, said second cavity having a same shape as that of the container; and main blow molding the intermediary molded body within said main blow metal mold by main blowing a hot gas in the intermediary molded body to further inflate the molded body.

4. A method of manufacturing a container with a suspension grip, the container being suspendable from the suspension grip, the method comprises the steps of:

setting a bottomed intermediary molded body, which is prepared by blow molding a bottomed preform, having on a bottom thereof a same suspension grip of the container in a main blow metal mold, said main metal mold comprising a) a barrel-forming metal mold section, b) a suspension grip-protecting metal mold section, and c) a stretcher rod arranged axially opposite to said suspension grip-protecting metal mold section, said barrel-forming metal mold section and said suspension grip-protecting metal mold section, in combination, forming a cavity having a same shape as that of the container, said suspension grip-protecting metal mold section being provided at the front end thereof with a suspension grip-protecting space, said suspension grip-protecting metal mold section and said stretcher rod each being axially movable within said cavity;

axially stretching the intermediary molded body by lowering the stretcher rod and the suspension grip-protecting metal mold section at a same speed under the condition of the bottom of the intermediary molded body being pinched from the inside and outside thereof respectively by the stretcher rod and the suspension grip-protecting metal mold section by inserting the stretcher rod in said intermediary molded body and inserting the suspension-grip thereof in said suspension grip-protecting space; and blow molding said intermediary molded body within said main blow metal mold under the condition of said suspension grip-protecting metal mold section being combined with said barrel-forming metal mold section.

5. A method of manufacturing a container with a suspension grip, which comprises the steps of:

setting a bottomed intermediary molded body having on a bottom thereof a same suspension grip as that of the container, which is prepared by pre-blow molding a bottomed preform, in a main blow metal mold, said main blow metal mold comprising a) a barrel-forming metal mold section forming a cavity, b) a suspension grip-protecting metal mold section, c) a stretcher rod, and d) a stretching counter metal mold section arranged axially opposite to said stretcher rod, said suspension grip-protecting metal mold section being divided into two halves which are faced with each other and are arranged slidably onto the lower end of the barrel-forming metal mold section so as to be closeable and openable themselves, each of said halves being provided on the facing surface thereof with a suspension grip-protecting space so that the suspension grip of said intermediary molded body can be pinched between the suspension grip-protecting spaces of said halves when the two halves are closed, said stretcher rod and said stretching counter metal mold section each being axially movable within the cavity of said barrel-forming metal mold section;

axially stretching said intermediary molded body by lowering the stretcher rod and the suspension grip-protecting metal mold section at a same speed under the condition of the bottom of the intermediary molded body being pinched from the inside and outside thereof respectively by the stretcher rod and the stretching counter metal mold section;

removing said stretching counter metal mold section from said blow metal mold;

closing said suspension grip-protecting metal mold section to make a condition of said suspension grip-protecting metal mold section being combined with said barrel-forming metal mold section; and blow molding said intermediary molded body within said main blow metal mold under said combined condition of the suspension grip-protecting metal mold section and the barrel-forming metal mold section.

* * * * *